No. 653,797. Patented July 17, 1900.
W. R. FOX.
TRIMMING MACHINE.
(Application filed Sept. 25, 1897.)
(No Model.) 3 Sheets—Sheet 1.
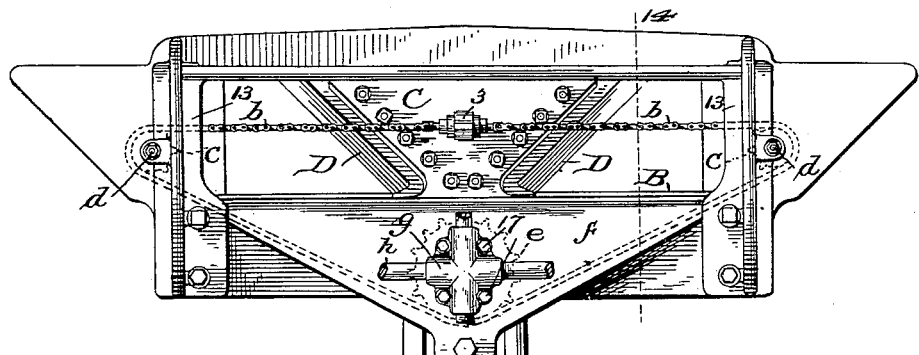
Fig. 1.
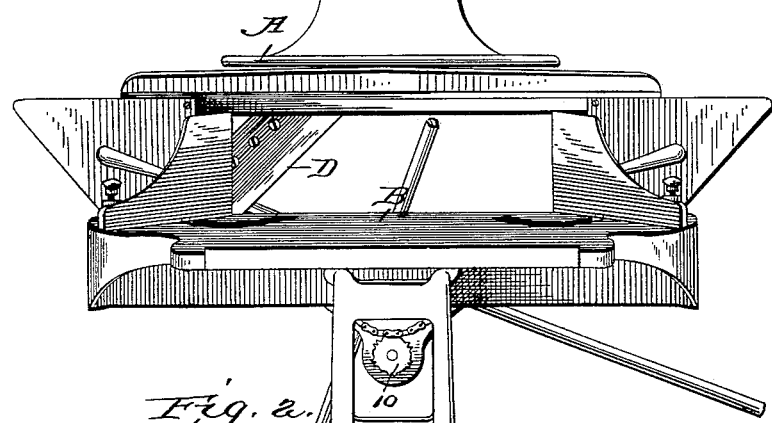
Fig. 2.
Attest
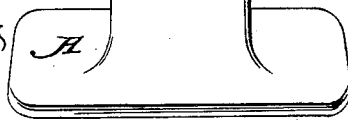
Inventor
Wm. R. Fox
by Ellis Spear
Atty
THE NORRIS PETERS CO., PHOTO-LITHO., WASHINGTON, D. C.

No. 653,797. Patented July 17, 1900.
W. R. FOX.
TRIMMING MACHINE.
(Application filed Sept. 25, 1897.)
(No Model.) 3 Sheets—Sheet 2.
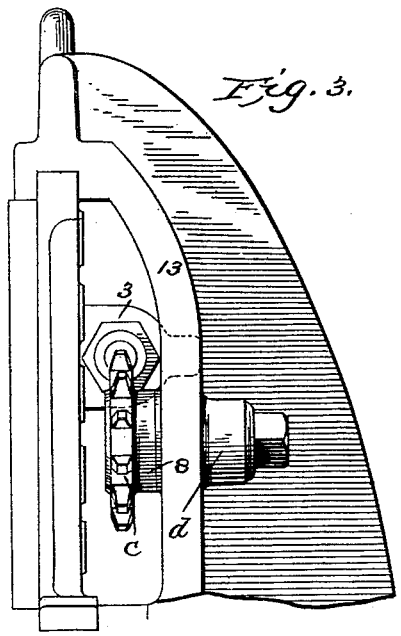
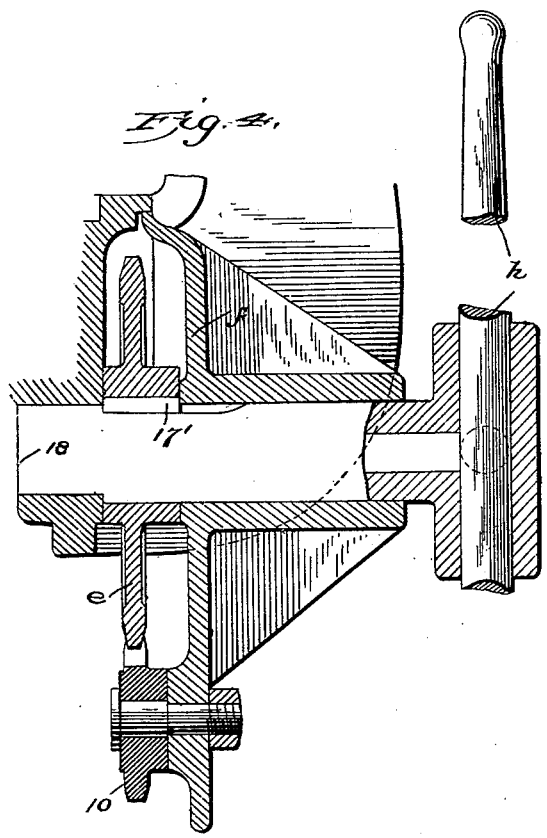
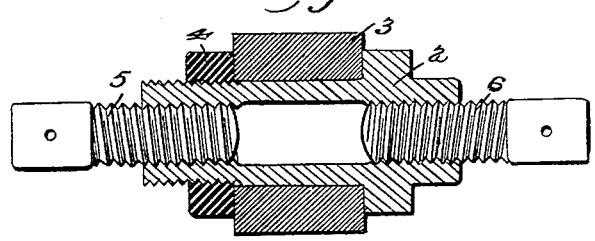

No. 653,797. Patented July 17, 1900.
W. R. FOX.
TRIMMING MACHINE.
(Application filed Sept. 25, 1897.)
(No Model.) 3 Sheets—Sheet 3.
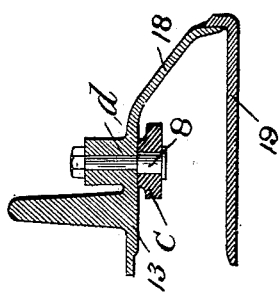
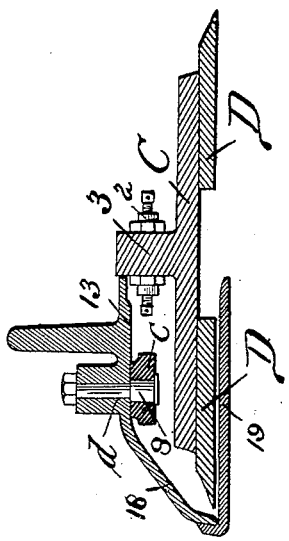
Fig. 6.
Attest
Inventor
Wm. R. Fox

UNITED STATES PATENT OFFICE.

WILLIAM R. FOX, OF GRAND RAPIDS, MICHIGAN, ASSIGNOR TO THE FOX MACHINE COMPANY, OF SAME PLACE.

TRIMMING-MACHINE.

SPECIFICATION forming part of Letters Patent No. 653,797, dated July 17, 1900.

Application filed September 25, 1897. Serial No. 653,053. (No model.)

*To all whom it may concern:*

Be it known that I, WILLIAM R. FOX, a citizen of the United States, residing at Grand Rapids, Kent county, Michigan, have invented certain new and useful Improvements in Trimming-Machines, of which the following is a specification.

My invention relates to a trimming-machine of the class in which a reciprocating cutter is used adapted to operate with a shear cut, the material to be cut being held against gages, these gages supporting the work in the path of the cutter.

The invention consists, first, in the means for reciprocating the knife-carrier; secondly, in a shield for the projecting portions of the knife, and, finally, in the details of construction, all as hereinafter fully described.

In the accompanying drawings, Figure 1 represents a rear view of my improved trimmer; Fig. 2, a front view. Figs. 3, 4, and 5 are sectional detail views. Fig. 6 shows a horizontal section, the two guards or shields for the knives, one at each end, and on the left the adjacent parts.

The base of the machine is shown at A, and this supports a table B, which is provided with ways adapted to receive the carrier C for the knives D, these parts being illustrated in patents heretofore granted to me. The knife-carrier C has been operated heretofore by a lever having a rack-and-gear connection with the carrier, and with an operating connection of this kind a ratchet movement is necessary if the carrier is to be moved any considerable distance, and I have aimed in the present construction to obviate this objection and provide means for moving the carrier any distance in a continuous operation of the lever. To this end I provide the carrier with a boss 3, Figs. 1 and 5, on its rear face, to which is connected the ends of a chain $b$, preferably similar to the chains used on bicycles, and the loops of the chain pass over sprocket-wheels $c$, having bearings at the ends of the frame proper, as at $d$. From thence the chain passes down over a main driving-sprocket $e$, supported between the side of the table and a depending apron $f$. The shaft of this sprocket is extended for connection with the head $g$ of a lever-support, this head providing four sockets, into each of which is fitted a handle $h$. It will thus be seen that the continuous operation of the lever will drive the carrier to the limit of its movement without necessitating any ratchet connection. The draft is taken on the center of the carrier, and as the fulcrum of the lever is low down there is not so much liability of tipping the machine, and at the same time the handles are brought into a convenient position for the operation.

The chain is fastened to the heads of right and left hand screw-threaded bolts 5 6, Fig. 5, and the stretch of the chain is taken up by these bolts, which are threaded into the bushing 2, turning in the boss 3 on the carrier, the stud 2 being held from turning by the check-nut 4. If it is desired to tighten the chain, the bushing 2 is revolved, and as 5 is a right-hand thread and 6 a left the chain will be tightened or loosened accordingly.

The sprocket-wheels $c$ are secured to the frame on studs 8. The chain passes over these wheels down under the large sprocket $e$ and is held from being disengaged with this sprocket by the idler 10.

The chain and sprockets are covered by the apron $f$, which also prevents chips from dropping on the chain. A shield 13 at each end prevents the chips from falling on the chain as they are shoved from the knife by the gage. 14 is the line of the gage, which is sufficiently removed from the end of the frame to allow most of the chips to drop off before being pushed over against shield 13.

The handles $h$ are held in place by the disk $g$ and the screws 17. The sprocket $e$ is secured to the handle-shaft by a key 17', and this shaft has a bearing on the inside of the frame at 18.

I have shown more clearly in Fig. 6 my improved shield for the knife. The shield 13 is extended around the end of the knife, as shown at 18, and laps upon a plate 19, standing near to and parallel with the blade of the knife when said knife is moved to its limit. This covers the open side of the angle-plates and forms a protecting-case, of which there is one at each end, and allows more complete protection than the plate heretofore shown by me, as it covers the sides and edges of the knives when they are projected.

What I claim is—

1. A trimmer comprising a table, a cutter-carrier a chain connected with said carrier, sprockets supporting the chain at the ends of the frame a driving-sprocket engaging said chain below the level of the table and an idler-sprocket engaging the opposite side of said chain to prevent its being displaced, substantially as described.

2. A trimmer comprising a table, a carrier having cutters, a bushing rotatably mounted in a boss or projection on said carrier, driving and supporting sprockets, a driving-chain passing over said sprockets, and right and left screws connected with the ends of the chain and engaging corresponding threads in the bushing, substantially as described.

3. A trimmer comprising the horizontal table, the cutter-carrier moving thereon, the driving-sprocket beneath the table, the supporting-sprockets at the ends thereof, the chain passing over said sprockets and connected with the carrier, and the vertical shield depending from the table to protect the chain and sprocket beneath the table, substantially as described.

4. A trimmer comprising a table, a carrier moving thereon having cutters, a chain, operating and supporting sprockets for supporting and operating said chain, and hollow shields at each end inclosing the chain and end sprockets and adapted to receive the knives at the end of their movement in either direction, substantially as described.

In testimony whereof I affix my signature in presence of two witnesses.

WILLIAM R. FOX.

Witnesses:
 JNO. DUFFY,
 ELIZABETH JONES.